United States Patent
Grimm et al.

(10) Patent No.: US 11,839,183 B2
(45) Date of Patent: Dec. 12, 2023

(54) FIELD DRYING AND GAS EMISSION USING SUBSURFACE IRRIGATION SYSTEMS

(71) Applicant: Grimm's Gardens, L.L.C., Hiawatha, KS (US)

(72) Inventors: Kurt D. Grimm, Hiawatha, KS (US); Koertland Beyer, Sabetha, KS (US)

(73) Assignee: Grimm's Gardens, L.L.C., Hiawatha, KS (US)

(*) Notice: Subject to any disclaimer, the term of this patent is extended or adjusted under 35 U.S.C. 154(b) by 0 days.

(21) Appl. No.: 17/451,190

(22) Filed: Oct. 18, 2021

(65) Prior Publication Data

US 2022/0124991 A1 Apr. 28, 2022

Related U.S. Application Data

(60) Provisional application No. 63/198,560, filed on Oct. 27, 2020.

(51) Int. Cl.
*A01G 25/06* (2006.01)
*A01G 25/16* (2006.01)

(52) U.S. Cl.
CPC ............ *A01G 25/06* (2013.01); *A01G 25/165* (2013.01); *A01G 25/167* (2013.01)

(58) Field of Classification Search
CPC ..... A01G 25/06; A01G 25/165; A01G 25/167
See application file for complete search history.

(56) References Cited

U.S. PATENT DOCUMENTS

| | | | |
|---|---|---|---|
| 1,350,229 A | 8/1920 | Lee | |
| 4,293,237 A * | 10/1981 | Robey | E02B 11/00 405/51 |
| 4,348,135 A * | 9/1982 | St. Clair | A01G 25/06 47/1.01 R |
| 5,221,158 A * | 6/1993 | Norsworthy | E02B 11/00 405/51 |
| 6,018,909 A | 2/2000 | Potts | |

(Continued)

FOREIGN PATENT DOCUMENTS

| | | |
|---|---|---|
| CN | 101790304 A | 7/2010 |
| CN | 102150585 A | 8/2011 |

(Continued)

OTHER PUBLICATIONS

Kansas Department of Health and Environment, KDHE Division of Environment Former American Cleaners, KDHE Environmental Conference, Oct. 22, 2018, 23 pages, Topeka, United States.

(Continued)

*Primary Examiner* — Monica L Perry
*Assistant Examiner* — Aaron M Rodziwicz
(74) *Attorney, Agent, or Firm* — Coughlin Law Office LLC; Daniel J. Coughlin; Stuart M. Aller

(57) ABSTRACT

Aeration and drying of subsurface soils with a subsurface irrigation system. An air inlet and bypass pressure regulator allow pressurized gas to be introduced into a zone of the system to aerate and dry a field. Pressurized gas or aerosolized agrochemicals are delivered through emitters integrated into the driplines within the system. Emitters integrated into the driplines allow aeration and drying of subsurface soils during times of season when high amounts of precipitation or localized flooding interfere with the systems use for irrigation.

20 Claims, 6 Drawing Sheets

(56) References Cited

U.S. PATENT DOCUMENTS

| | | | |
|---|---|---|---|
| 6,173,526 B1 | 1/2001 | Mazzei | |
| 6,712,552 B1 | 3/2004 | Kepler et al. | |
| 6,959,882 B1 * | 11/2005 | Potts | A01G 25/06 |
| | | | 239/548 |
| 7,033,108 B1 * | 4/2006 | Hummert | F16K 21/20 |
| | | | 405/36 |
| 7,681,810 B2 | 3/2010 | Keren | |
| 8,511,585 B2 | 8/2013 | Keren | |
| 8,919,038 B2 * | 12/2014 | Jensen | A01G 31/02 |
| | | | 47/48.5 |
| 10,251,336 B1 | 4/2019 | Ksiksi et al. | |
| 10,285,342 B2 | 5/2019 | Ensworth et al. | |
| 10,548,268 B1 * | 2/2020 | Lu | A01G 25/023 |
| 10,577,755 B1 * | 3/2020 | Mikkelson | A01G 25/167 |
| 2009/0242492 A1 * | 10/2009 | Ruskin | C02F 3/103 |
| | | | 210/605 |
| 2019/0307083 A1 * | 10/2019 | Henry | E02B 13/00 |

FOREIGN PATENT DOCUMENTS

| | | |
|---|---|---|
| EP | 0683973 A1 | 11/1995 |
| KR | 101215777 B1 | 12/2012 |
| RU | 2132125 C1 | 6/1999 |
| WO | 1997025856 A1 | 7/1997 |

OTHER PUBLICATIONS

Lamm, Freddie R., et al, Design and Management Considerations for Subsurface Drip Irrigation Systems, Jan. 2003, 10 pages, K-State Northwest Research Extension Center, Colby, Kansas, United States.

Lamm, Freddie R., et al., Design Considerations for Subsurface Drip Irrigations (SDI) Systems, Irrigation Management Series, Jul. 2003, 8 pages, Kansas State University Agricultural Experiment Station and Cooperative Extension Service, Manhattan, Kansas, United States.

Rogers, Danny H, et al., Subsurface Drip Irrigation in Kansas: An Overview, K-State Research and Extension, May 2018, 4 pages, Kansas State University Agricultural Experiment Station and Cooperative Extension Service, Manhattan, Kansas, United States.

Rogers, Danny H., et al., Subsurface Drip Irrigation (SDI) Components: Minimum Requirements, K-State Research and Extension, Sep. 2018, 4 pages, Kansas State University Agricultural Experiment Station and Cooperative Extension Service, Manhattan, Kansas, United States.

В.К. Губин, et al., Waste Water subsurface irrigation system, Jun. 27, 1999, 7 pages, This is a machine translated text of a patent application published on Jun. 27, 1999, Russia.

상수용, Underground Watering-Draining System, This is a machine-translated text of a South Korean patent application published on Dec. 26, 2012, Publication No. KR101215777B1, South Korea.

坦纳姆·费尔德, Water Irrigation System Including Drip Irrigation Emitters, This is a machine translated text of a patent application published on Jul. 28, 2010, Publication No. CN101790304A, China.

任新坤, et al., Greenhouse canopy environment control system and method based on drip irrigation pipe network, Aug. 17, 2011, 14 pages, This is a machine translated text of a patent application originally published on Aug. 17, 2011, China.

* cited by examiner

FIELD DRYING AND GAS EMISSION USING SUBSURFACE IRRIGATION SYSTEMS

CROSS REFERENCES

This application claims priority of U.S. Provisional Application No. 63/198,560 filed on 27 Oct. 2020.

REFERENCE TO RESEARCH

Not Applicable.

REFERENCE TO CDS

Not Applicable.

FIELD OF THE INVENTION

The present disclosure relates to a method for aerating and drying subsurface soils with a subsurface irrigation system. The method comprises emitting gas into subsurface soil in combination with allowing excess water to enter lateral driplines via admission through emitters during times of season when high amounts of precipitation, wet spots, or localized flooding interfere with the systems use for irrigation.

BACKGROUND

Subsurface irrigation systems have been in use for micro-irrigation of plant crops, gardens, orchards and other food and non-food applications. Subsurface irrigation systems can apply low volumes of water for beneficial plant growth outcome. Water is applied in small volumes to the root zone of plants below the soil surface. Subsurface irrigation systems may use built-in emitters within polyethylene tubes or tape, known as driplines, buried in the soil subsurface. Water reaches the root zone by being injected through the driplines containing the emitters. The emitters deliver water directly to the root zone of plants via capillary action in the soil. The emitters are found at fixed intervals or series within and along the subsurface driplines. Hydraulic designs of subsurface irrigation systems are determined based on the application including variables such as plant type, soil type, and water needs. The application also influences irrigation line spacing, emitter placement, and installation depths. The application is met by balancing water demand, irrigation supply, precipitation, and stored soil water.

SUMMARY

The present disclosure applies to aerating and removing water from subsurface soil through use of subsurface irrigation systems, hereinafter referred to as systems. Systems may include subsurface drip irrigation or subsurface textile irrigation having drip tape or tubes, hereinafter referred to as driplines. We disclose a system having a plurality of driplines with integrated emitters that can aerate and dry the subsurface soil. Air, beneficial gas, or aerosolized agrochemicals can be emitted through the emitters from a pressurized source and emit to the surrounding soils. Water from the subsurface soil may be admitted into the driplines through the emitters and be passively or actively purged from the system.

Removal of water from a field having soils with excess water is met by allowing field water to enter the system through emitters positioned within a plurality of driplines. The system is connected to a pressurized gas source such as a positive displacement air blower, pump, compressor, tank, or other pressurized source. A flush valve on the system may be opened depending on the capacity of the pressurized gas source. Pressurized gas is introduced into a zone of the system to aerate subsurface soil by expelling gas through emitters and to flush any water collected within the driplines out of a zone of the system.

A period of waiting may occur while water passively enters the system through the emitters. Pressurized gas may be introduced into a zone of the system continuously or intermittently. Pressurized gas may be introduced intermittently at intervals between 1 to 24 hours per day. An intermittent introduction of pressurized gas may occur between repeating instances where water can enter the system from the subsurface soil. Allowing water to enter the system from the subsurface may be synchronized with times when subsurface soils are saturated with water. Alternatively, allowing water to enter the system may occur when no pressure is being applied to the system. The period between introducing pressurized gas may comprise waiting between 1 to 12 hours to allow water from the subsurface soils to enter the system. Alternatively, the period between introducing pressurized gas may comprise waiting between 2 to 24 hours. In a passive system, water may be allowed to enter the system indefinitely when not being used for irrigation. Water for irrigation may not be injected into the system during these drying periods. This allows for greater addition of oxygen to the soil from the atmosphere as water leaves the subsurface soils and enters the system. Alternatively, a vacuum may be incorporated on an outlet or flush valve of the passive system to hasten collection of water from the subsurface soil. A flush valve of the passive system may be left open to allow excess water to escape the system under the influence of gravity. The flush valve may then be closed when the system is used for irrigation. A flush valve of the passive system may be left closed to allow for collection of water from the subsurface soil into the system.

A pressure regulator may be used within the system in applications where fields include changes in topography gradients. The pressure regulator may not be necessary in the system where fields have topography that is flat and change in gradient is minimal. In systems that have a pressure regulator, the pressure regulator may be modified by removing restrictive parts, such as a spring or a high-pressure diaphragm, within the regulator to facilitate the introduction of pressurized gas. The restrictive parts may be replaced with a low-pressure diaphragm for use in the aeration process. Alternatively, the pressure regulator may be bypassed with a T-valve. The T-valve may introduce the pressurized gas into an irrigation zone for aeration of subsurface soils or into a water removal zone for drying of subsurface soils.

A beneficial gas, such as carbon dioxide ($CO_2$), or agrochemical can be delivered by connecting a pressurized gas to the system through a main pipe. A water pump may be disconnected from the system. A gas pump is connected to the system. A flush valve on the system may be closed to prevent release of the beneficial gas or agrochemical directly to the soil surface. The pressurized gas is directed to a zone of the system. The gas may be introduced and directed into a zone of the provided system at between one pound per square inch (psi) to 160 psi of pressure. The process of introducing the pressurized gas into the field may occur continuously or intermittently throughout a day as discussed previously.

Some of the other advantages of the current disclosure may include:
  a. Actively and passively removing water from the subsurface soil;
  b. Drying of wet spots caused on fields by higher precipitation or localized flooding;
  c. Improving soil dynamics through aerating and water removal from soils;
  d. Gas delivery system for agrochemicals in proximity to plant root mat zones;
  e. Limiting crop yield stress by drying high-water holding capacity soils such as loam or silty clay loans;
  f. Using reclaimed industrial byproduct, such as carbon dioxide, to aid in plant growth, waste management, carbon tax credits, and increased yields;
  g. Decreasing the amount of total nutrients, such as nitrogen (N), phosphorus (P), potassium (K), sulfur, molybdenum, boron, and zinc, that may leach to lower levels of the soil profile; and
  h. Decreasing wait times for planting or harvesting crops due to moist fields.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

BRIEF DESCRIPTION OF DRAWINGS

Aspects are illustrated by way of example, and not by way of limitation, in the accompanying drawings, wherein.

DETAILED DESCRIPTION

Figure 1:
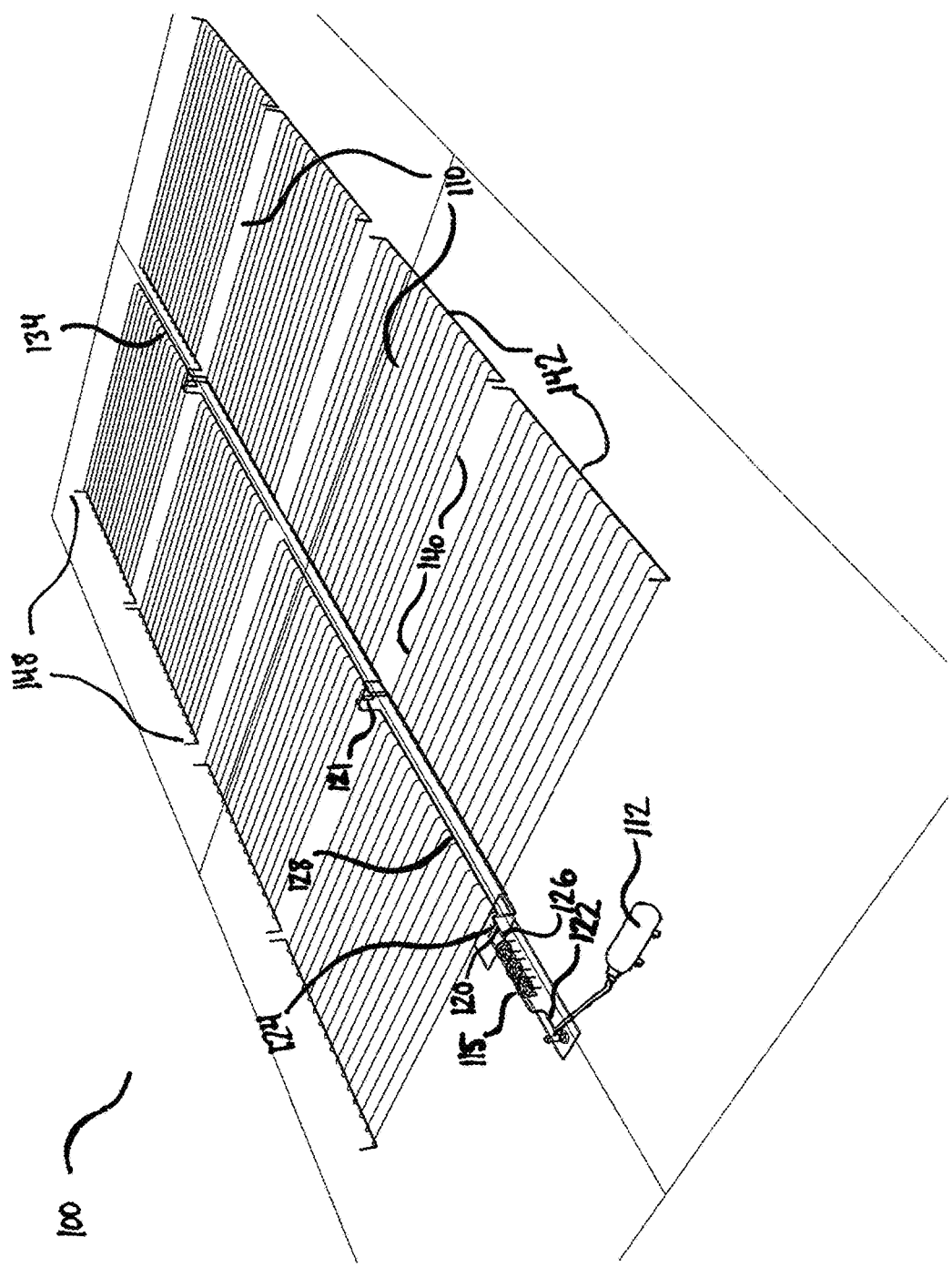
FIG. 1 depicts a top perspective view of a subsurface irrigation system comprising a mainline, submains, headers, flush pipes and a plurality of driplines.

FIG. 1 shows an overview of the subsurface irrigation system or system 100. The system 100 comprises a gas or air inlet 122 operably connected to a gas or air pump 115. The air pump 115 may be a lobe type, rotary screw air compressor, positive displacement blower, or other pneumatic device. The air inlet 122 may comprise a pressure gauge (not shown) to ensure the correct flow rate of pressurized air introduced into the system 100 by the air pump 115. The air pump 115 is connected to the system 100 to introduce pressurized air into a zone 110. Beneficial gases may be used in the injection within a subsurface irrigation system. For instance, reclaimed carbon dioxide from industry, such as an ethanol plant, may be piped or otherwise provided to the subsurface irrigation system. Added benefits to using reclaimed carbon dioxide are the use of carbon tax credits, potential increase of yields (approximately 15 bushels/acre may equate to $160/acre), and reuse of a waste gas. The reclaimed gas may be pumped in at varied concentrations at a range of 300 parts per million (ppm) to 700 ppm. The reclaimed gas may be pumped through the driplines at a pressure between zero to 30 psi, or between 5 psi to 25 psi, or at least 5 psi, or at least 10 psi, or at least 15 psi, or less than 30 psi, or less than 25 psi, or less than 20 psi. Nitrogen may be introduced into the subsurface soil for use by nitrogen-fixing bacteria that are beneficial to the treated plants. Oxygen may be introduced into the subsurface soil for use by aerobic bacteria that are beneficial to the breakdown of detritus material into organic matter or to reducing anaerobic soil conditions.

As shown in FIG. 1, pressurized gas or air may be obtained from a pressurized source connected to the system 100. The pressurized gas is delivered to a plurality of zones via a main pipe 126 connected to the system 100. Pressurized gas is injected into the main pipe 126 via the air inlet 122. Pressurized gas may be introduced within a range of one psi to 160 psi, or between 10 psi to 160 psi, or between 20 psi to 160 psi, or above 10 psi, or above 20 psi, or between 10 psi to 30 psi, or between 10 psi to 20 psi. The pressurized gas may be delivered to the plurality of zones at intervals of 10 minutes (min.) to 30 min. in duration. The delivery of pressurized gas may be delivered at repeating intervals occurring from between 2 hrs. to 24 hrs per day. One application may be to deliver pressurized gas at 15-minute intervals occurring from a range of 4 hours (hr.) to 6 hrs. Another application may be to dry the subsurface soil of a 10-acre zone of the field by introducing pressurized air into the system for a 30-minute interval repeatedly 3 times per day with 20 psi of air pressure at the emitters 150 with a volume of 400 cfm. Another application may be to aerate a 20-acre zone of the field by introducing pressurized air into the system over a constant 30-minute period repeatedly 12 times per day with 20 psi of air pressure at the emitters 150 with a volume of 800 cfm. Water from the subsurface soil may enter the system between the intervals after pressurized gas is delivered for subsequent purging. Other applications varying in interval duration and timing of repeated occurrences may be realized and tailored to the application for the field.

Figure 3:
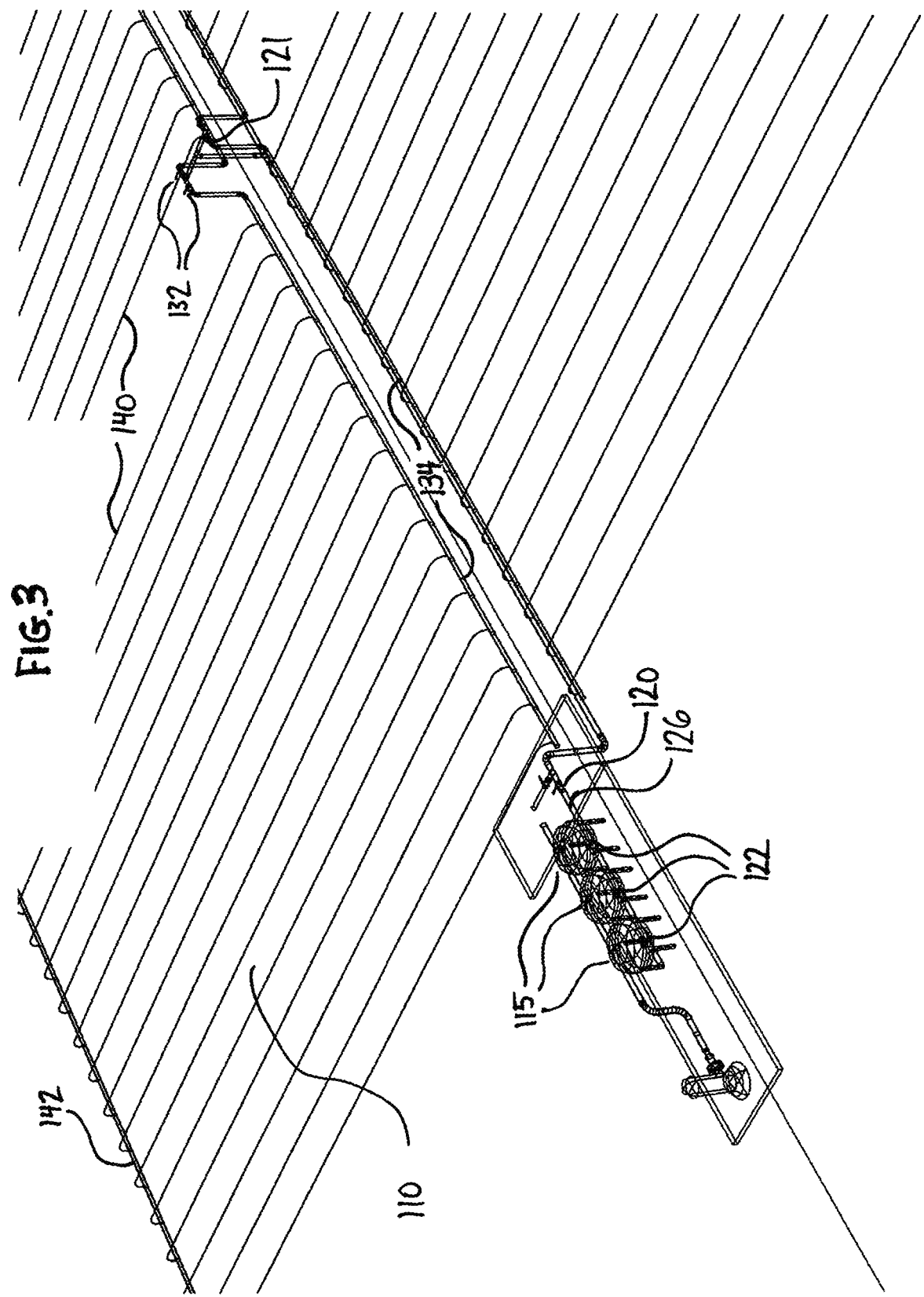
FIG. 3 depicts a cropped and enlarged view of a portion of FIG. 1 showing components of the subsurface irrigation system in more detail.

As shown in FIG. 3, the operator may adjust the main pressure regulator 120 or a secondary pressure regulator 121 by operating an external valve of the pressure regulator. Alternatively, the external valve may be automatically opened and closed to maintain a set pressure on the system 100. Incoming gas pressure may also be changed by the degree of internal valve closure within the pressure regulator. A gauge on the pressure regulator may indicate the pressure of incoming gas and be read by the operator. The main pressure regulator 120 or the secondary pressure regulator 121 may also comprise a replacement valve. In current practice, the secondary pressure regulator 121 uses the replacement valve. The replacement valve may comprise a low-pressure diaphragm to replace a high-pressure diaphragm to reduce a limiting capacity of the pressure regulator. The lower incoming gas pressure may open a flow path within the pressure regulator by pushing up on the low-pressure diaphragm. The flow path may not open for incoming gas pressure if a high-pressure diaphragm is used. The high-pressure diaphragm may be stiff and have less flexibility thereby preventing or reducing bypass of gas through the pressure regulator in such circumstances. The high-pressure diaphragm may be bypassed by an increase of pressure from the incoming gas. The top of the diaphragm may be pushed towards the regulating end of the pressure regulator as the gas is delivered thereby opening the flow path through the pressure regulator.

Driplines may tolerate up to 30 psi of pressurized gas due to the types of materials constructed from. The operator may want to use the low-pressure diaphragm in the pressure regulator under such circumstances. As mentioned, in certain systems and scenarios, the secondary pressure regulator 121 may comprise a high-pressure diaphragm that may be replaced with a low-pressure diaphragm. The low-pressure diaphragm may be used in cases where gas is introduced through the driplines 140 under 10 psi, 20 psi, 30 psi, or other low-pressure. A high-pressure diaphragm may be used when pressures of incoming gas higher than 30 psi can be tolerated by the driplines 140 and are warranted by the application. Alternatively, restrictive parts that control the high-pressure diaphragm such as a spring or pneumatic system may be removed to allow bypass when aerating at lower pressures.

A T-valve may be incorporated at a main pressure regulator 120. An operator or an automated controller may adjust the position of the T-valve to bypass the main pressure regulator 120 allowing air to flow with little to no interference through the main pipe 126. The replacement T-valve may contain a ball solenoid valve or gate valve to serve as the bypass. The system may facilitate greater flushing pressures when T-valve is in use during the aeration process.

Pressurized air introduced into the system 100 is dependent on factors such as time, pressure, volume, and land grade. Pressurized air may be introduced within a range of 10 to 20 psi at 400 cubic feet per minute (cfm) for the system to function efficiently. Some applications may benefit from introducing air at a pressure between 10 to 30 psi at 400 cfm to 500 cfm. In other applications, pressurized air may be introduced into the system with a pressure range from 100 psi to 160 psi having a volume up to 1600 cfm. Pressurized air may be released through a relief valve 124. The main pipe 126 is the main delivery pipe to a plurality of downstream pipes such as a downstream submain 128, header 134, dripline 140, and flush pipe 142. The pipes or tubes of the system 100 may be made from low- or high-density polyethylene or other materials such as galvanized steel, copper, plastic, polyvinyl chloride, chlorinated polyvinyl chloride, polyethylene, cross-linked polyethylene (PEX) or other suitable material. Sizes and materials selected for the pipes are dictated based on the flow rates and pressures by the system. The main pipe 126 may be approximately four to ten inches in diameter, the submain 128 and header 134 may be two to six inches in diameter, the dripline 140 may be ⅝" to 1⅜" in diameter, and the flush pipe 142 may be approximately two to four inches in diameter. Pressurized air is directed to a plurality of zones 110 by a submain 128 connected to the main pipe 126.

Figure 2:
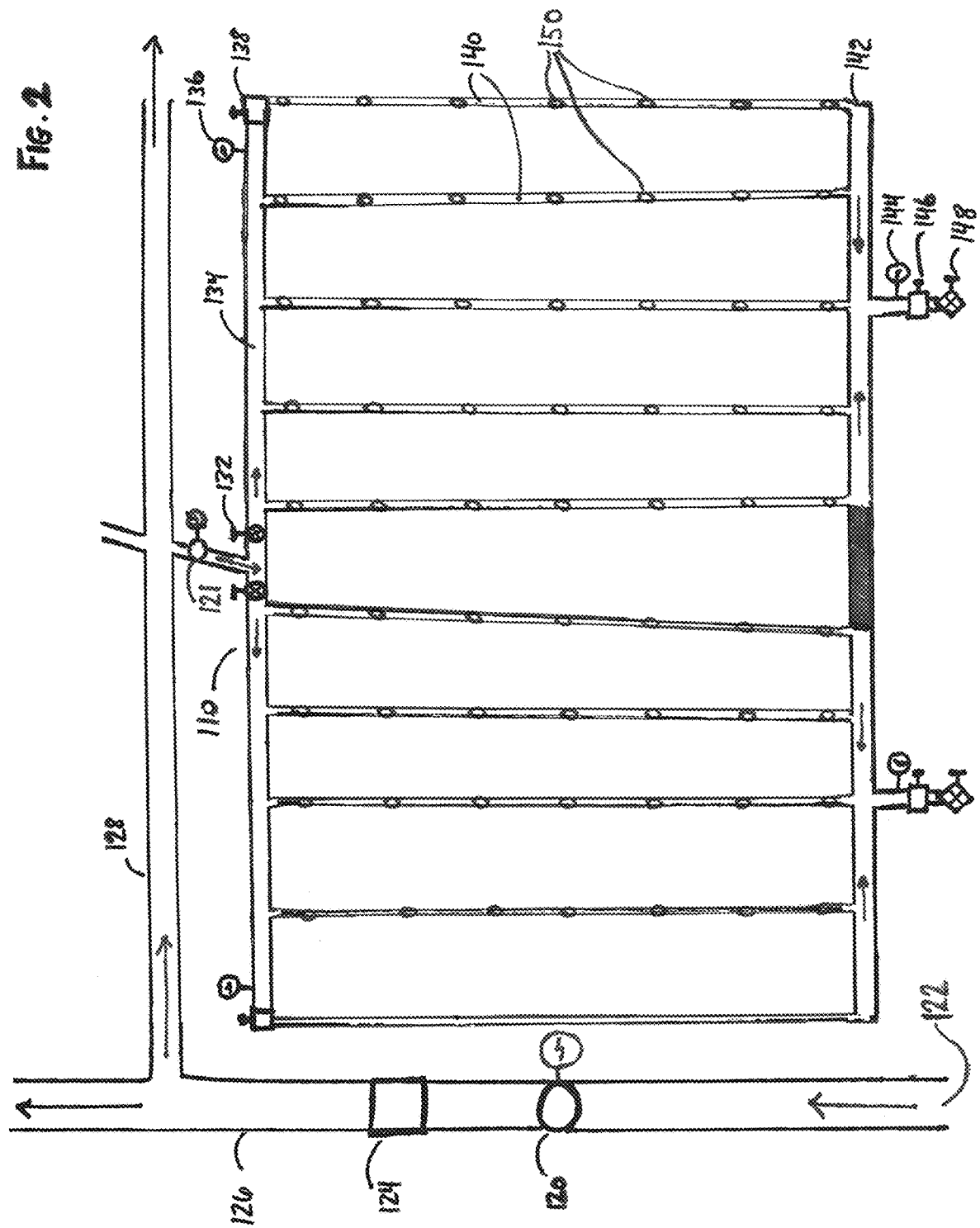
FIG. 2 depicts a top plan view of a zone of the subsurface irrigation system comprising the mainline, submains, headers, flush pipes, plurality of driplines, and a plurality of emitters.

As shown in FIG. 2, pressurized air reaches a zone 110 via the submain 128. The submain 128 delivers the pressurized air to a header 134. In some systems, the submain 128 may serve as the header 134. The header 134 operably connects to a secondary pressure regulator 121 and a plurality of zone controls 132. The zone controls 132 may be optionally installed to separate a zone into subzones. The secondary pressure regulator 121 and zone controls 132 may include the replacement valve for bypass. The secondary pressure regulator 121 may be open or closed to control the flow of pressurized air into the zone 110. The secondary pressure regulator 121 and zone controls 132 may be controlled using an electronic, mechanical, or pneumatic control system. Alternatively, the secondary pressure regulator 121 and zone controls 132 may be controlled manually. The secondary pressure regulator 121 may also serve as a pressure regulation valve. Air injection is usually applied to a given zone 110 or portion of the zone 110 at a given time.

In some applications, pressurized air is repeatably introduced into a zone 110 three times per day. In other applications, pressurized air is repeatably introduced into the zone 110 three times per week. In some applications, pressurized air may be introduced into the zone up to 12 times per day. Alternatively, the pressurized air may be introduced at an increasing or decreasing intervals based on the ever-changing aeration and drying variables of the field.

As shown in FIG. 2 and FIG. 3, a plurality of zone controls 132 may be used to permit pressurized air into the plurality of driplines within a zone 110. A zone control 132 may be operably connected to the header 134. A header pressure gauge 136 may allow the operator to evaluate the pressurized air introduced by monitoring the flow rate and pressures within the header 134. Comparison of the header pressure gauge 136 with pressures and flow rates at a flush pressure gauge 144 may allow the operator to monitor and reveal any problems that may be occurring within the zone 110. Pressure gauges may be installed at any location of the pipes including the submain 128, the header 134, and/or the flush pipe 142. Pressure gauges may be located at the inlet to the zone 110 prior to a header relief valve 138. Pressure gauges may also be located at the zone outlet prior to a flush relief valve 146.

The flow rate and pressure readings of the zone 110 provide the operator signals about dripline 140 and emitter 150 performance. The air relief valves allow air to exit the pipes to reduce the potential for damage from exceeding the maximum allowable pressure of the dripline 140. The relief valves, as other parts of the system, may be manipulated manually by the operator or controlled automatically by either a passive or active engagement control when air pressure exceeds operating limits and venting is necessary to prevent burst pressure. Automatic control may provide a more efficient and precise injection of air and air relief according to the aeration and drying needs of the subsurface soil. Automatic timers, weather-based analyzers, and soil water sensors may be linked to the injectors, valves, and compressor to coordinate the sequencing and operation of air injection events.

As shown in FIG. 2, driplines 140 are specialized for injecting water through small openings to the surrounding soil via emitters 150 that are built-in the driplines 140. In the present disclosure, the driplines 140 are utilized to introduce pressurized air or other gas through the system 100 to the field via the emitters 150 to aerate or otherwise condition the surrounding soil out. The pressurized gas comes from a source of pressurized gas. The source 112 operably connects to the system 100 by a main pipe 126. The pressurized gas is then directed and delivered to a first zone of the system 100 as shown in FIG. 2. The zone 110 comprises a plurality of driplines laterally spaced away from one another. The plurality of driplines extends longitudinally across a field below the surface of the field.

The dripline 140 may be made from thicker-walled tubing or thinner-walled drip tape. The dripline 140 may be extruded or welded in segments. The dripline 140 is available in a variety of diameters, thicknesses, sizes, and emitter 150 spacings. Diameters may range from 16 millimeters (mm) (approximately 0.625 or ⅝") to 35 mm (approx. 1.375 or 1⅜"). Diameters may range from 16 mm (approx. 0.625 or ⅝") to 22 mm (approx. 0.875 or ⅞") in field applications. Thicknesses may range from 8 to 15 mils.

Driplines may be installed within a 25 to 46 centimeters (cm) (approx. 10- to 18-inches) depth range to efficiently affect the root zone of crops. Driplines installed within a 25 to 40 cm (approx. 10- to 16-inch) depth range may be preferable in field applications. Alternatively, in other soil types the dripline 140 depth may range from 20 to 60 cm (approx. 8- to 24-inches) while not greatly affecting crop yields.

Lateral spacing between driplines may range from 76 to 184 cm (approx. 30 to 72 inches) apart. In some applications, lateral spacing between driplines may be a 152 cm (approx. five-foot or 60-inch) spacing for a 30-inch crop row (approx. 76 cm) such as in corn production. Alternatively, the lateral spacing between driplines may be a 184 cm (approx. six-foot or 72-inch) spacing for a 36-inch crop row (approx. 92 cm). The dripline 140 spacing may also be dictated by the flow of air to deliver high uniformity directly to the soil-plant root zone. Driplines with a ⅝" diameter may have a 27" (approx. 70 cm) separation between emitters 150 along a dripline used in field applications. The emitter 150 in this application may have a 0.1 gallon per hour (gph) flow rate. Driplines with a ⅞" diameter may have an 18" (approx. 46 cm) separation between emitters 150 along a dripline used in other field applications. The emitter 150 in such applications may have a range from 0.16 gph up to a 0.50 gph flow rate. In other applications, driplines having a 12-inch, 18-inch, 24-inch (approx. 30 cm, 46 cm, 60 cm, respectively) or other suitable separation between emitters 150 may be used.

As shown in FIG. 2, emitters 150 are disposed within the driplines to inject water through small openings to the surrounding soil. In the present disclosure, the emitter 150 used for irrigation is used to emit or give off air or other gases to the surrounding soils for beneficial purposes and to admit water from subsurface soil through the emitter 150 into the driplines 140. The pressurized air is given off through a plurality of the emitters 150 disposed within the dripline 140 to the surrounding subsurface soil. The emitters 150 may be incorporated into the dripline 140 as one contiguous piece or inserted during the manufacturing process, such as by plastic welding the emitter 150 to an inside surface of the dripline. The emitters 150 may provide a specific flow rate of air through the tubing to the surrounding soil. The air is introduced into the soil through an inlet of the emitter 150 to aerate and condition the surrounding soil. The emitter 150 also includes an outlet through which fluid may exit the emitter 150 oriented toward an aperture in a portion of the tube. A flow path within the emitter 150 connects the inlet and the outlet. Emitters 150 that are pressure-compensated or non-pressure compensated may be used during aeration and water removal in field applications.

The spacing between emitters 150 considers many variables including crop rooting, soil type, plant spacing, crop root zones, investments costs, installer preference and other specific applications. Emitter 150 spacing may range from 10 to 76 cm (approx. 4 to 30 inches) apart along the driplines. Spacings between emitters 150 may range from 30 to 60 cm (approx. 12 to 24 inches) apart in other applications. Other spacings may be made depending on the specific application. Installation depths for the emitters 150 is another consideration to be made. Deeper installations may reduce the performance of aeration or water removal of the soil root zone. Emitters 150 may be buried at depths of 40 to 46 cm (approx. 16 to 18 inches) from the soil surface. Emitters 150 may also be buried at shallower installations in the 30 to 36 cm (approx. 12- to 14-inch) range below the soil surface. Depth of tillage practices may affect shallower applications. Restrictive soil layers may also affect depth selection.

Figure 4:
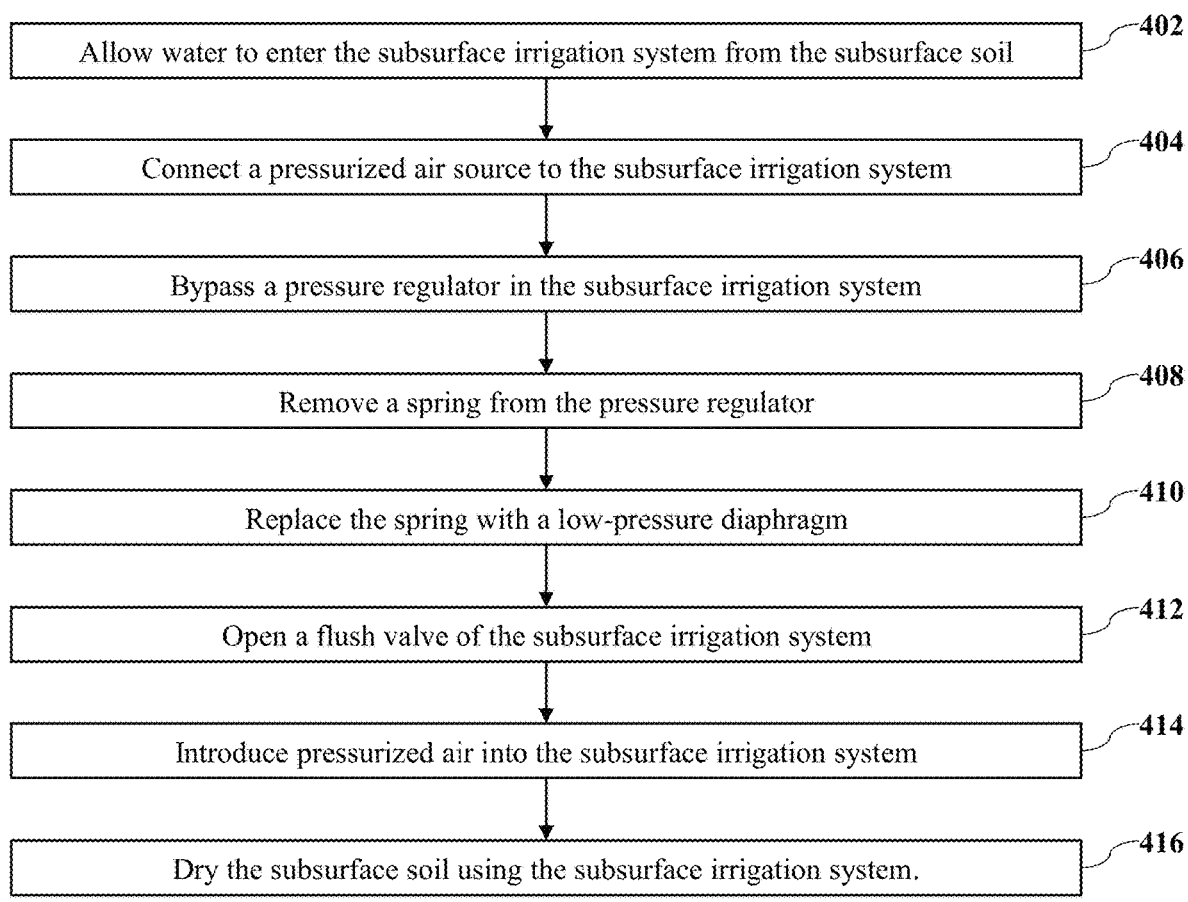
FIG. 4 is a flowchart for actively drying a field using a subsurface irrigation system.

A method is shown in FIG. 4 for actively drying a field by forcing excess water through the system 100 for removal. In turn, oxygenated air is added back into the subsurface soil due to atmospheric pressure as in-situ water is removed. Field water is permitted to enter the driplines, according to step 402. Water collects within the dripline 140 by flowing into the driplines through the emitters 150. The air pump 115 is connected to the system 100 to flush the dripline 140 with pressurized air, according to step 404. A bypass may be installed in the pressure regulator of the system, according to step 406. Bypass of pressurized air may be accomplished by removing a spring from the pressure regulator, according to step 408. The replacement valve for the spring may be a low-pressure diaphragm, according to step 410. When a flush valve 148 is opened, collected water is given a path to be released from the system, according to step 412. In current practice, flush valves 148 are opened during the active drying operation and may be closed when not in use. The process of allowing field water to enter the system 100 may comprise a period of waiting while water passively enters the driplines. In some applications, this period may comprise waiting at least 6 hours before flushing the collected water from the system. Pressurized air is then introduced into a zone 110 of the system 100 after an interval of waiting, according to step 414. The system 100 also aids in active drying of surrounding soils as water flows by capillary action into the emitters 150, according to step 416.

The collected water may be actively flushed out of the flush pipe 142 by pressurized gas provided by the air pump 115 operably connected to the system 100. The flush pipe 142 may be connected at the end of the plurality of driplines opposite the connection to the header 134. The flush pipe 142 may be placed at a depth between 60 and 108 cm (approx. 24 to 42 inches) in depth. The flush valve 148 operably connects to the flush pipe 142. The flush valve 148 may comprise a ball valve placed on a riser exposed at the soil surface as shown in FIG. 1. Opening of the flush valve 148 allows collected water to be expelled from the zone 110 via the flush pipe 142. A flush pipe may be trenched and placed below the lowest dripline 140 to passively release collected water. The flush pipe may be 5 to 12 cm (approx. 2 to 4 inches) in diameter. The flush pipe may be placed beneath the dripline 140 in the shallow subsurface, 60 to 108 cm (approx. 24 to 42 inches) in depth. Efficient and even water removal depends on the frequency of the spacing of the driplines. The flush pipe may be common to all zones, multiple zones, or one zone for water removal to aid in adding oxygen to the soil. Alternatively, the flush pipe may be placed at a lower level than the header 134 for collecting water in a passive system mode. A field with significant changes of gradient in the topography allow gravity and water pressure to aid passive release of collected water from the system to the flush pipe. Burying the flush pipe at a lower level than the header pipe and the drip lines may eliminate the need for use of compressed air or gas at air inlet 122. The flush pipe may work in coordination with the pressurized air or gas by initiating water removal when the positive displacement blower is in operation thereby pushing collect water out of the flush pipe.

Figure 5:
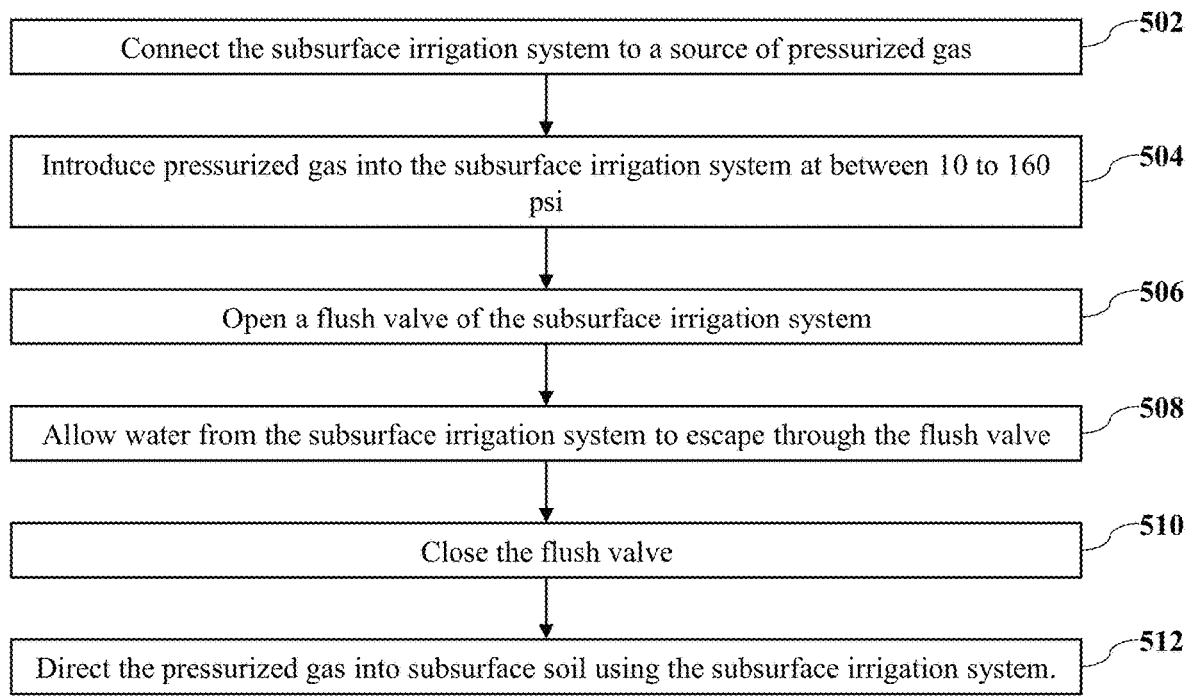
FIG. 5 is a flowchart for aerating a field with a pressurized gas using a subsurface irrigation system.

A method for providing aeration, a beneficial gas, or aerosolized agrochemicals to subsurface soil is shown in FIG. 5. A source of pressurized gas is connected to a subsurface irrigation system, according to step 502. The source of pressurized gas may include an air pump 115, a pressurized source 112 of beneficial gas, an agrochemical stored in a tank, or other source. A main pipe 126 may be connected between the gas source and the system 100. The main pipe 126 is pressurized via the air inlet 122 by connecting the source of pressurized gas to the system 100. In consideration of variables such as timing, flow, and rate, the operator directs the pressurized gas into a zone 110 of the system 100 to improve in-situ soil dynamics, according to step 504. Purging water from the subsurface irrigation system may be done by first opening a flush valve 148, according to step 506. Water is then allowed to escape through the flush valve 148 as the pressurized gas forces the water out of the system 100, according to step 508. The flush valve 148 may then be closed to provide for enhance aeration of the subsurface soils, according to step 510. The pressure of the gas may be between 10 psi to 160 psi. Several applications where the pressurized gas is introduced into the system to aerate subsurface soils of the field may occur, according to step 512.

The secondary pressure regulator 121 and zone controls 132 between the submain 128 and the header 134 may be closed to alternate aeration between zones. Alternatively, the secondary pressure regulators 121 and zone controls 132 may be opened to one zone 110 at a time depending on the air pressure utilized and zone sizes which range from approximately 5 acres to 20 acres. In some applications, the process of aerating a field may include introducing pressurized air for 30-minute applications into a 10-acre zone of the field repeatedly 3 times per day at 20 psi with a volume of 400 cfm. Alternatively, pressurized air may be introduced for 30-minute applications into a 10-acre zone repeatedly 6 times per day at 30 psi with a volume of 400 cfm. A flow rate of 20 psi at 800 cfm over a constant 30-minute period may be utilized to inject air at the emitter 150 locations for enhanced soil dynamics from soil aeration. Based on soil types, pressurized air or gas may be introduced to the subsurface through the emitters 150 by aerating in a range between one to 12 times per day while waiting from 2 to 24 hours per day before repeating. A sign that active air injection is taking place may be to observe air bubbles at the soil surface if there is ponding present at the surface of the field.

Non-emitted gas or collected water is received by a flush pipe 142. The flush pipe 142 is positioned at the distal end of the dripline 140. Opening of the flush valve 148 may allow purging of water collected in the system 100 from the flush pipe 142 during introduction of pressurized gas when used as an active system. The system 100 may also be used for water collection and discharge from the flush pipe 142 when the flush valve 148 is left open in a passive system. In a scenario where the flush valve 148 is left closed, water collection within the system 100 may occur. Alternatively, closing of the flush pipe 142 may allow positive pressure to build within the dripline 140 to induce air flow through the emitters 150 to aerate in-situ soil. A flush pressure gauge 144 allows the operator to evaluate air flow by monitoring flow rate and pressures within the flush pipe 142. A flush relief valve 146 may be opened if pressurized air exceeds operating limits to vent the pressurized air. The valves, such as the flush relief valve 146 or the flush valve 148, may be manipulated manually by the operator. Alternatively, the valves may be automated by a passive or active engagement control.

Figure 6:
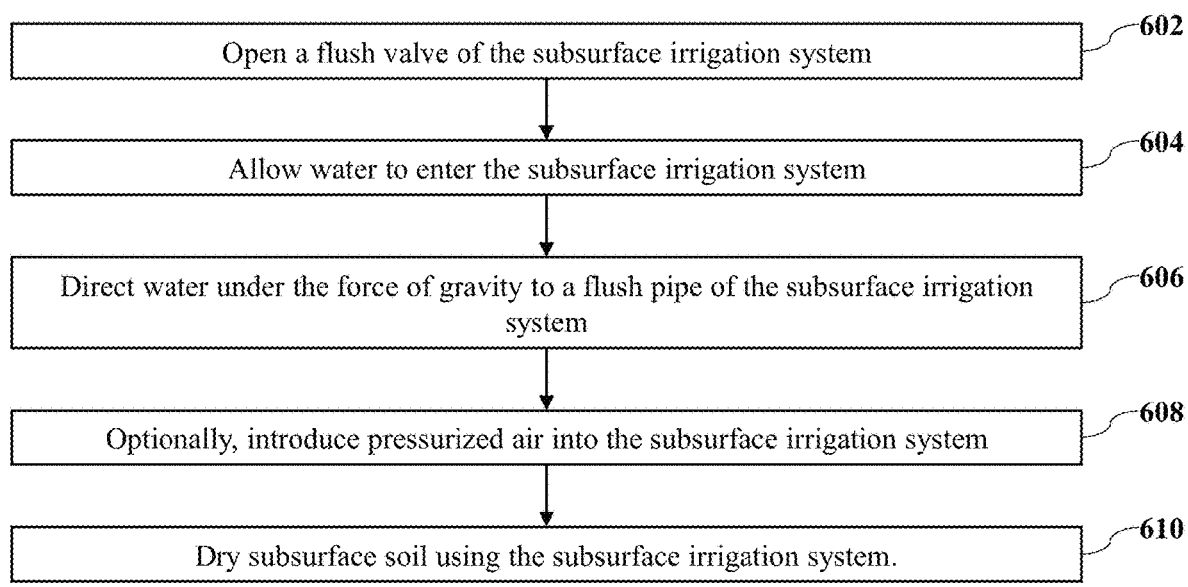
FIG. 6 is a flowchart for passively drying a field using a subsurface irrigation system.

As shown in FIG. 6, a method for passively drying subsurface soil using a subsurface irrigation system is to first open the flush valve 148, according to step 602. The secondary pressure regulator 121 and zone controls 132 between the submain 128 and the header 134 may be opened. The amount of water collected from the subsurface soil may be dependent on in-situ soil moisture content. The water from the subsurface soil enters through the emitters 150 of the system 100 to dry the soil of the field, according to step 604. The water is directed through the system 100 by the force of gravity towards the flush pipe 142, according to step 606. Flushing of collected water may also be aided by the fall of the pipes within the system 100 and the grade of the topography. Optionally, introducing pressurized air into the system 100 may reduce the drying time, according to step 608. The subsurface soil dries as in-situ water admits through the emitters and is discharged through the system, according to step 610. Alternatively, a vacuum pump may be installed on an outlet near the flush valve 148 of the system to hasten removal of the excess water thereby drying the field at a quicker pace.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

We claim:

1. A method for using a subsurface irrigation system comprising the steps of:
   a. receiving water from subsurface soil into a dripline through an emitter during a collection period;
   b. connecting a pressurized air source to the subsurface irrigation system;
   c. introducing pressurized air into the dripline during a flush period, wherein the pressurized air is introduced into the dripline during the flush period at between 10 pounds per square inch (psi) to 160 psi; and d. expelling water from the subsurface irrigation system through a flush valve with pressurized air.

2. The method of claim 1, wherein the collection period lasts between 1 hour and 12 hours in between flush periods.

3. The method of claim 1, wherein the flush period is repeated up to 12 times per day.

4. The method of claim 3, wherein the flush period lasts between 10 minutes to 60 minutes.

5. The method of claim 1, wherein the subsurface irrigation system comprises a plurality of driplines that are buried below a top surface of subsurface soil at a depth of between 33 centimeters to 46 centimeters.

6. The method of claim 5, wherein the subsurface irrigation system comprises a flush pipe connecting the plurality of driplines at a first end, wherein the flush pipe is buried below the top surface of subsurface soil at a depth between 60 centimeters to 108 centimeters.

7. The method of claim 6, where a plurality of flush valves connected to the flush pipe are automated to open during the flush period.

8. The method of claim 1, wherein the flush valve is closed during an irrigation period and open during a non-irrigation period.

9. The method of claim 1, wherein the pressurized air enters the subsurface soil at between 10 psi to 30 psi.

10. The method of claim 1, wherein the pressurized air enters an air inlet upstream of the dripline during the flush period when the flush valve, that is downstream of the dripline, is open.

11. The method of claim 1, further comprising the steps of:
a. irrigating subsurface soil during an irrigation period with the substeps of:
i. closing the flush valve;
ii. emitting water through the emitter;
b. drying the subsurface soil during the flush period with the substeps of:
i. opening the flush valve;
ii. discharging the water through a flush pipe of the subsurface irrigation system.

12. The method of claim 11, further comprising the step of:
a. introducing pressurized air into subsurface soil during the flush period by emitting air through the emitter with the flush valve being open.

13. The method of claim 11, wherein receiving water from subsurface soil into the dripline through the emitter lasts at least 12 hours per day.

14. The method of claim 11, wherein the subsurface irrigation system comprises:
a. a plurality of driplines that are buried below a top surface of subsurface soil at a depth between 33 cm to 46 cm.

15. The method of claim 14, wherein
the flush pipe is connected to the plurality of driplines and is buried below the plurality of driplines.

16. A method for using a subsurface irrigation system comprising the steps of:
a. receiving water from subsurface soil into a dripline through an emitter during a collection period;
b. connecting a pressurized air source to the subsurface irrigation system;
c. bypassing a pressure regulator in the subsurface irrigation system;
d. introducing pressurized air into the dripline during a flush period; and
e. expelling water from the subsurface irrigation system through a flush valve with pressurized air.

17. The method of claim 16, wherein the step of bypassing the pressure regulator is accomplished by introducing pressurized air at greater than 30 psi.

18. The method of claim 16, further comprising the step of:
a. drying the subsurface soil.

19. A method for using a subsurface irrigation system comprising the steps of:
a. receiving water from subsurface soil into a dripline through an emitter during a collection period;
b. connecting a pressurized air source to the subsurface irrigation system;
c. reducing a limiting capacity of a pressure regulator;
d. introducing pressurized air into the dripline during a flush period; and
e. expelling water from the subsurface irrigation system through a flush valve with pressurized air.

20. The method of claim 19, wherein the step of reducing the limiting capacity of the pressure regulator is accomplished by replacing a high-pressure diaphragm with a low-pressure diaphragm adapted to admit pressurized air at less than 30 psi.

* * * * *